United States Patent [19]

Skuratovsky et al.

[11] Patent Number: 4,932,265
[45] Date of Patent: Jun. 12, 1990

[54] PRESSURE TRANSDUCER USING THICK FILM RESISTOR

[75] Inventors: Eugene Skuratovsky, Mayfield Heights; Michael L. Sturdevant, Concord, both of Ohio

[73] Assignee: The Babcock & Wilcox Company, New Orleans, La.

[21] Appl. No.: 352,684

[22] Filed: May 10, 1989

Related U.S. Application Data

[63] Continuation of Ser. No. 131,873, Dec. 11, 1987, abandoned.

[51] Int. Cl.⁵ ............................ G01L 7/08; G01L 9/06
[52] U.S. Cl. ................................... 73/727; 73/721; 338/4
[58] Field of Search ............ 73/721, 720, 727, DIG. 4, 73/726, 754; 338/4, 42

[56] References Cited

U.S. PATENT DOCUMENTS

| 4,217,783 | 8/1980 | Ito et al. | 338/4 |
| 4,311,980 | 1/1982 | Prudenziati | 338/4 |
| 4,586,018 | 4/1986 | Bettman | 338/4 |

Primary Examiner—Donald O. Woodiel
Attorney, Agent, or Firm—Vytas R. Matas; Robert J. Edwards; Eric Marich

[57] ABSTRACT

A pressure transducer utilizes a diaphragm made, for example, of ceramic or the like having upper and lower surfaces. One surface of the diaphragm receives an elongated thick film resistor. Circuitry is connected to the resistor for measuring any changes in resistance due to strains or forces applied to the resistor. Pressures applied perpendicularly to the longitudinal direction of elongation of the resistor produces high outputs in the form of changes in resistance which can be used to calculate strains in the longitudinal and transverse directions as well.

3 Claims, 6 Drawing Sheets

FIG. 9
dR/R for a Thick Film Resistor
Oriented Radially or Tangentially

PRESSURE TRANSDUCER USING THICK FILM RESISTOR

This is a continuation of application Ser. No. 131,873, filed Dec. 11, 1987, now abandoned.

FIELD AND BACKGROUND OF THE INVENTION

The present invention relates in general to pressure transducers, and, in particular, to a new and useful transducer using thick film resistors.

Pressure transducers utilizing flat diaphragms with strain gages to measure pressure induced deflections are well known. (See U.S Pat. No. 3,341,794 to Stedman; U.S. Pat. No. 3,456,226 to Vick and U.S. Pat. No. 3,505,634 to von Vick). In general, these transducers utilize flat metal or silicon diaphragms with thin-film, bonded foil, or silicon type strain gages on them. The strain gages are placed on the diaphragm to respond to tensile, tangential strains at the center and compressive, radial strains at the outer edge of the diaphragm.

Figure 1:
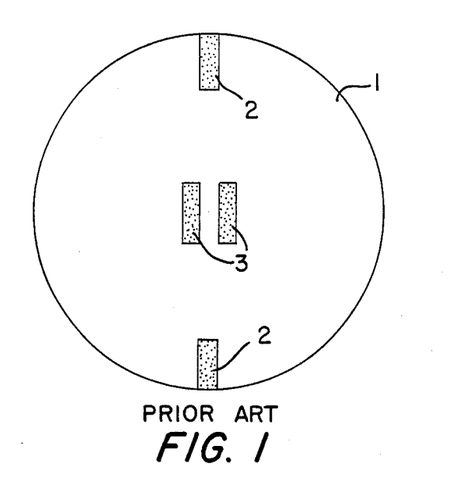
FIG. 1 is a plan view of a pressure transducer according to the prior art utilizing a ceramic disk carrying thin film resistors.
Figure 2:
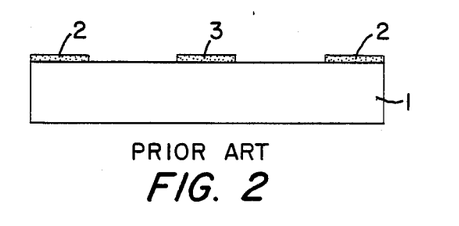
FIG. 2 is a side elevational view of FIG. 1.
Figure 3:
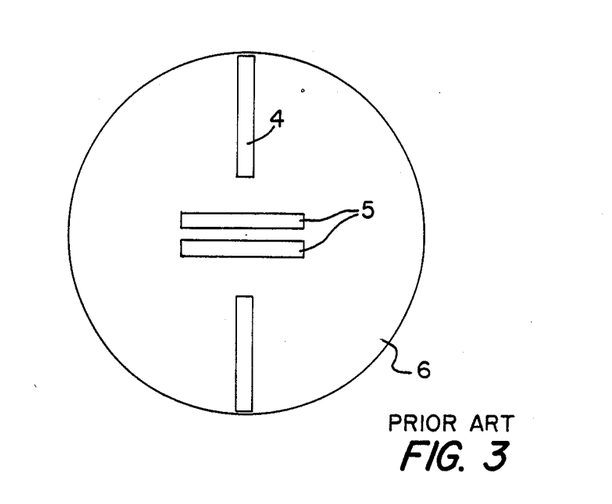
FIG. 3 is a plan view of another prior art transducer using thick film resistors.
Figure 4:
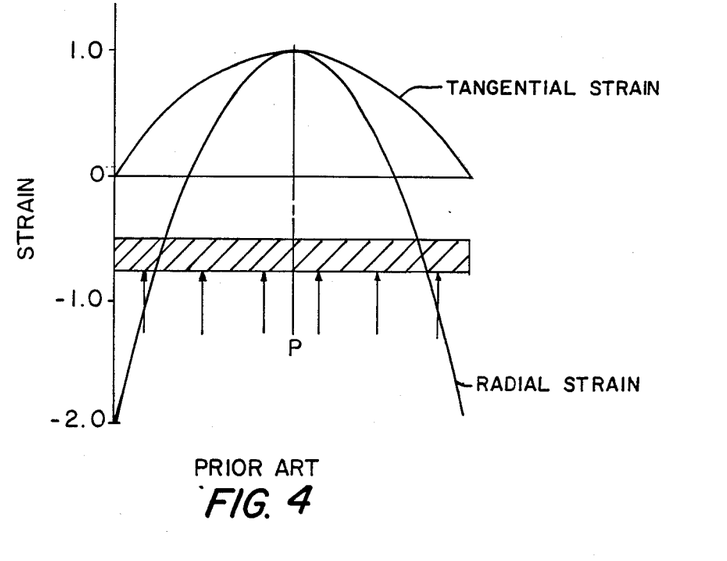
FIG. 4 is a diagrammatical side sectional view of FIG. 3 showing the distribution of tangential and radial strain across the diaphragm.

As shown in FIGS. 1 and 2, a cylindrical ceramic diaphragm 1 carries a plurality of thick film resistors 2 positioned to respond to radial strains. Thick film resistors 3 are provided near the center of the disk for responding to tangential strains. FIGS. 3 and 4 show resistors 4 and 5 oriented on a diaphragm 6. The resistors are oriented so that the strain they are meant to measure is parallel to the resistors' longitudinal axis as shown in FIG. 4. The resulting resistors are limited in size to the size of the diaphragm. P shows the direction of applied pressure to the diaphragm.

The strain gages are connected in a Wheatstone bridge configuration so that adjacent legs of the bridge sense strains of opposite sign resulting in an additive effect to the transducer output. Recently, ceramic diaphragms with screen printed and fired thick film resistors have attracted interest as pressure transducers (see U.S. Pat. No. 4,311,980 to Prudenziati and "The Thick Film Strain Gage", Howard A. Nielsen, Jr ISA 32nd International Instrumentation Symposium, Paper Session 4.7, May 8, 1986). These ceramic/thick film transducers have been designed in a manner very similar to the transducers before them with the resistors arranged in a Wheatstone bridge configuration.

Thick film resistors are known to be susceptible to a problem known as "burst noise" (see "Physical Model of Burst Noise in Thick Film Resistors", T. M. Chen and J. G. Cottle, Solid State Electronics, Vol. 29, No. 9, pp 865–872, 1986"; and "Characteristics, Sources and Minimization of Thick Film Resistor Burst Noise", J. G. Cottle and T. M. Chen, ISHM Proceedings of the International Symposium on Microelectronics, 1986, pp. 835–839). This phenomena can cause noise in the output signal of a ceramic/thick film pressure transducer with a magnitude greater than 0.15% of span. Burst noise has been shown to be minimized by using thick film resistors of low resistivity and large size. In pressure transducer applications, it is desirable to have high resistance to minimize power consumption. The resistance of a thick film resistor is given by:

$$R = p \frac{Xl}{wt}$$

where R is the resistance, p is the resistivity of the resistor compound, 1 is the length of the resistor, w is the width of the resistor, and t is the thickness of the resistor. To obtain high resistance, a high resistivity resistor compound or a large area resistor are required, that is, a long and narrow resistor is required. Since low noise and high resistance are desired, a lower resistivity thick film material must be used with a large area, that is, a long and narrow resistor.

Thick film resistors change resistance as a function of the average strain over the area of the resistor. To obtain maximum output, the resistors should be close to the center or close to the outer edge of the diaphragm to maximize the average strain level experienced by the resistor. A large diaphragm is required to accomodate four long and narrow resistors in the previously used Wheatstone bridge configuration and keep the average strains at the resistors high enough for good output. Since stresses in the diaphragm increase as a function of the square of the radius, large diaphragms have high stresses which are undesirable. There is not enough room on a small diaphragm to locate a full bridge using long and narrow resistors required for good noise performance. A half or quarter bridge has a smaller output than desired.

In the prior art, there is not room on the diaphragm for this type of resistor unless the diaphragm is very large. As diaphragm size becomes larger, the stresses in the diaphragm increase as a function of the square of the radius. This is undesirable from a diaphragm strength standpoint.

In the prior art, the output of the thick film resistor has been due to the radial and tangential strains in the ceramic diaphragm in the directions parallel and perpendicular to the gage axis. Thick film resistors to date have taken advantage of the gage factor of the resistor in a direction parallel to the resistor axis and the gage factor perpendicular to the resistor axis. The change in resistance for a thick film resistor experiencing a strain has been determined to date by:

$$\left.\frac{dR}{R}\right|_l = GF_l e_x \qquad \left.\frac{dR}{R}\right|_t = GF_t e_y$$

where $$\left.\frac{dR}{R}\right|_l$$

is the resistance change caused by a strain parallel to the length of the resistor, $$\left.\frac{dR}{R}\right|_t$$

is the resistance change cause by a strain perpendicular to the length of the gage, $GF_t$ is the gage factor of the resistor perpendicular to the length of the gage, $GF_l$ is the gage factor of the resistor parallel to the length of the gage $e_x$ is the strain parallel to the length of the gage, and $e_y$ is the strain perpendicular to the length of the gage. See J. Phys. D; Applied Physics, Vol. 12, 1979, pp. L51-53 "Strain Sensitivity in Film and Cermet Resistors: Measured and Physical Quantities", Morten et al.; IEEE Transactions on Components, Hybrids and Manufacturing Technology, Vol. CHMT-3, No. 3, Sept. 1980, Pp. 421–423 "Strain Sensitivity in Thick Film Resistors", Canali, et al; "Strain Sensitivity of Thick Film Resistors", J. S. Shah IEEE Transactions on Compon. Hybrids and Manufacturing Technology, Vol, CHMT-3, No. 4, 1980, pp. 410–420; "Changes in Thick Film Resistor Values Due to Substrate Flexure", P. J. Holmes, Microelectronics and Reliability, Vol. 12, 1973, pp. 395; and "Strain Characteristics of Thick Film Resistors and Its Application to a Strain Sensor", Osamu Abe and Yoshiaki Taketa, IMC, 1986 Proceedings, 1986, pp. 282-285.

SUMMARY OF THE INVENTION

The present invention takes advantage of the significant normal strain sensitivity of thick film resistors to increase output, while maintaining good noise characteristics and low stresses in the ceramic diaphragm. The total resistance change for a thick film resistor can be found from:

$$\frac{dR}{R} = C_x e_x + C_y e_y + C_z e_z + e_x - e_y - e_z$$

where $C_x$, $C_y$, and $C_z$ are resistivity coefficients for strains in the longitudinal, transverse and normal directions to the resistor and $e_x$, $e_y$, and $e_z$ are strains in the longitudinal, transverse, and normal direction to the resistor. The present invention takes advantage of the normal direction sensitivity of the resistor to increase the output of the pressure transducer by exposing the resistor to the pressure to be measured.

One embodiment of the invention utilizes a single resistor which is oriented radially at the center of the diaphragm and exposed to the pressure to be measured. The bridge completion is done externally or on a non-strained portion of the transducer. In this configuration, the measuring resistor measures the radial and tangential strains over the area of the resistor in addition to the normal strains due to the pressure. These strains can be calculated as follows:

$$e_x = \frac{1}{E_s}\left[\frac{3P}{8h^2}((1-v^2)a^2 + (3v^2 - 3)x^2) - vP\right]$$

$$e_y = \frac{1}{E_s}\left[\frac{3P}{8h^2}((1-v^2)a^2 + (v^2 - 1)x^2) - vP\right]$$

$$e_z = \frac{1}{E_r}\left[P - v'\left(\frac{3P}{8h^2}((1+v')2a^2 - (1+v')4x^2)\right)\right]$$

where $e_x$, $e_y$, and $e_z$ are the radial, tangential and normal strains, P is the applied pressure, v and v' are the Poisson's ratio of the substrate and resistor, a is the diaphragm radius $E_r$ and $E_s$ are the Young's modulus of the resistor and the substrate, h is the diaphragm thickness, and x is the radius at which the resistor is located (see "Pressure Component Construction", John F. Harvey, Van Nostrand Reinhold, 1980)

Accordingly, the object of the present invention is to provide a pressure transducer and method of measuring pressure which utilizes a diaphragm having upper and lower surfaces with at least one thick film resistor on one of the diaphragm's surfaces. Circuit means are provided for measuring any change in resistance of the thick film resistor upon the application of normal pressure on the diaphragm, and in particular, on the thick film resistor. An annular elongated thick film resistor can also be used on the diaphragm as can a plurality of thick film resistors extending substantially in the same direction on the diaphragm and including at least some annular parts.

A further object of the invention is to provide a pressure transducer which is simple in design, rugged in construction and economical to manufacture.

DESCRIPTION OF THE DRAWINGS

In the accompanying drawings, forming a part of this specifification, and in which reference numerals shown in the drawings designate like or corresponding parts throughout the same.

DESCRIPTION OF THE PREFERRED EMBODIMENTS

Figure 5:
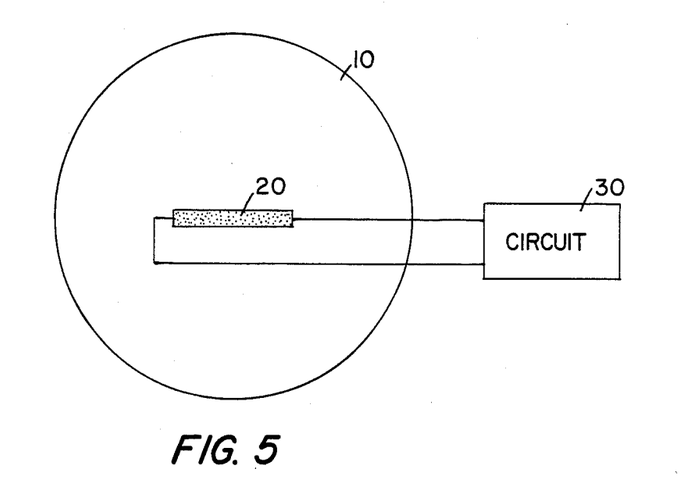
FIG. 5 is a top plan view of a pressure transducer in accordance with one embodiment of the invention.
Figure 6:
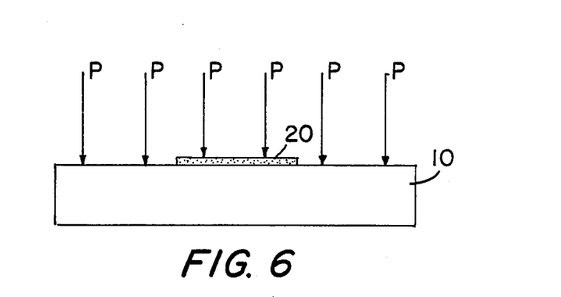
FIG. 6 is a side elevational view of FIG. 5 showing one configuration with the application of pressure on a side of the diaphragm carrying a thick film resistor.
Figure 7:
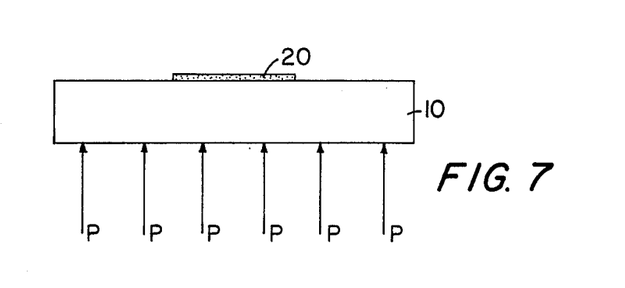
FIG. 7 is a view similar to FIG. 6 showing another configuration for the application of pressure.

Referring to the drawings in particular, the invention embodied in FIGS. 5, 6 and 7 comprises a pressure transducer having a disk shaped or substrate 10 with upper and lower surfaces. A thick film resistor 20 is deposited on one of the surfaces and is connected to a circuit shown schematically at 30, for measuring changes in resistance of the thick film resistor.

The change in resistance (dr/R) is found for a given diaphragm and thick film resistor compound after measuring the coefficients $C_x$, $C_y$, and $C_z$ for the resistor compound. This is done by performing three strain vs. output tests on a resistor and then solving the three output equations simultaneously. This was done on a particular resistor compound manufactured by Dupont and the following coefficients were found:

$$C_x = 25.3 \quad C_y = 23.5 \quad C_z = 11.5$$

For a diaphragm designed for measuring 7500 PSI using the configuration of FIG. 7, where the pressure to be measured is not applied to the thick film resistor, the relative output is 4. For the same diaphragm and thick film resistor material, but using the configuration of FIG. 6, where the pressure to be measured is applied to the thick film resistor, the relative output is 12.5.

The normal direction sensitivity of the thick film resistor has been found to be linear and repeatable with no hysteresis. The present invention thus allows for a highly accurate, low noise, and low stress (sturdy) pressure transducer. The composition of the resistor compound was Dupont "Birox" 1441.

In general, the resistor compound has a dielectric component and a conductive component. The dielectric component may comprise a borosilicate, leadborosilicate, aluminosilicate or a leadsilicate type of glass with possibly small additions of oxide, such as CdO, $Ca_2O_3$ or $Al_2O_3$. The conductive component may be a noble metal (Ag, Au, Pd) or an oxide or mixture thereof, or a conductive oxide of a noble metal.

By using a lower resistivity and larger size thick film resistor, the present invention can reduce burst noise in ceramic-thick film pressure transducers. Tests of currently available ceramic-thick film pressure transducers with bridge resistances of approximately 5000 ohms have shown noise levels of up to 0.15% of full scale output. Thick film resistors of lower resitivity, larger size, and 5000 ohms resistance, such as those the present invention make use of have been tested and found to have noise levels of 0.025% of full scale output.

By increasing the output of the thick film resistor, by taking advantage of its normal direction sensitivity, lower diaphragm stresses are necessary. This increases the factor of safety of the transducer for over pressure protection. For example, consider a ceramic diaphragm designed to measure 7500 PSI using thick film resistors. To obtain an output equal to that obtained by the prior art with a full Wheatstone bridge and a 0.100 inch thick diaphragm, the present invention can use a diaphragm 0.150 inch thick. This makes the diaphragm stronger to protect against failure in the event of an over pressure.

If lower power consumption is required, the thick film resistivity could be increased at some cost in greater noise, while maintaining the maximum diaphragm stress and output at the same level.

Figure 8:
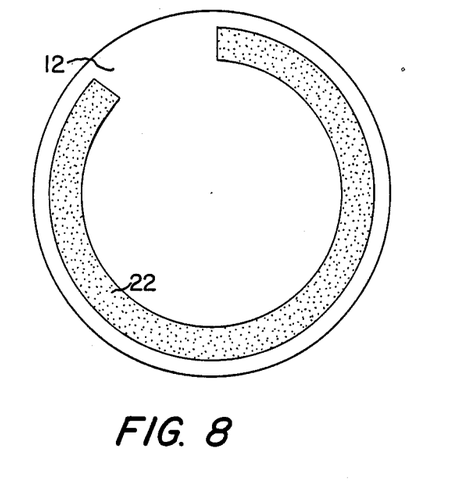
FIG. 8 is a plan view of a second embodiment of the invention.
Figure 9:
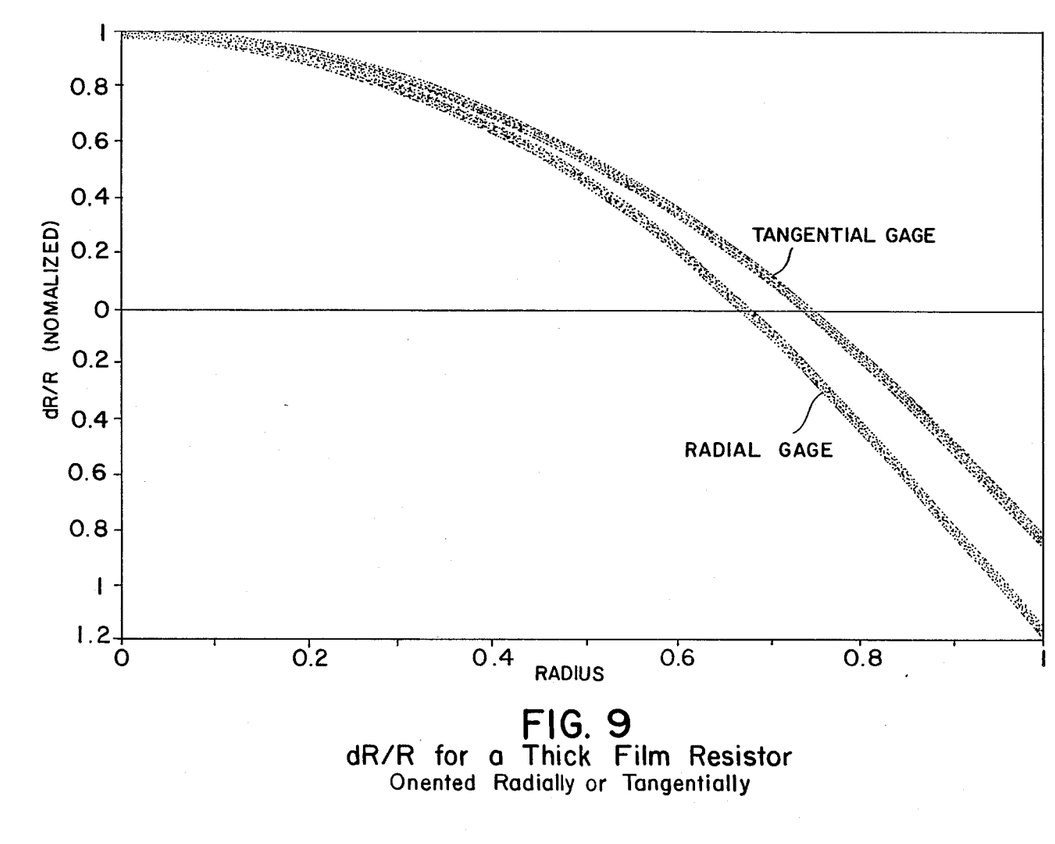
FIG. 9 is a graph plotting the change in resistance against radius for tangential and for radial gages in accordance with the present invention.

FIG. 8 shows a second embodiment of the invention, wherein the diaphragm 12 carries an annular thick film resistor 22 near the outer diameter of the diaphragm. This resistor is also connected to a circuit for measuring changes in resistance. The result is a somewhat lower output since the radial and tangential strains are of opposite signs. This configuration, however, allows for a very long and narrow resistor. The output for a thick film resistor oriented radially or tangentially at any point on a flat diaphragm is shown in FIG. 9. The total output is the average of the values for the above equation over the area of the resistor. The invention takes advantage of the thick film resistor's ability to sense strain in any direction. The outer gages which would be oriented to measure radial strain in prior art pressure transducers are oriented to measure the tangential strain along the resistor axis and the radial strain perpendicular to the resistor axis (see FIG. 10). The resistors are shaped to form annular areas at the outer edge of the diaphragm. This results in a dR/R for a long annular resistor similar to the dR/R for a short resistor oriented to measure radial strain and therefore a bridge output similar to that for the prior art pressure transducer. This orientation allows for longer, higher resistance, lower resistivity, and less noisy resistors than in the previous configurations.

Knowing that the thick film resistor is sensitive to the strains parallel and perpendicular to the resistor axis means that other resistor configurations can be chosen based on the dR/R desired from FIG. 9. A Wheatstone bridge using resistors of any configuration could be made. With the object of maximizing the output, the resistors should be located at diaphragm locations with the maximum average absolute dR/R value at the center and at the outer edge. Other orientations for long, narrow resistors that have the dR/R of the proper magnitude and sign to give outputs similar to the prior art include the configurations of FIGS. 11 and 12. Other configurations could be found by choosing the desired dR/R for the same leg of the Wheatstone bridge and going to FIG. 9 and finding the appropriate radius and resistor direction, remembering that the resistor will average the dR/R over the area of the resistor.

Figure 10:
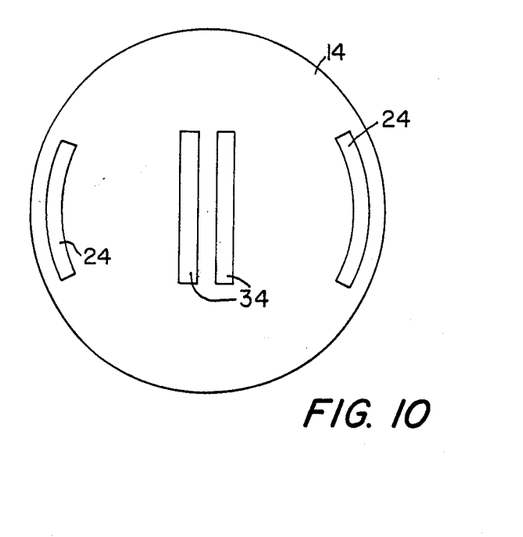
FIG. 10 is a plan view of a third embodiment of the invention.

FIG. 10 shows a flat diaphragm 14 carrying outer and inner thick film resistors 24 and 34 which are all oriented in substantially the same direction, in spite of the annular form of outer films 24.

Figure 11:
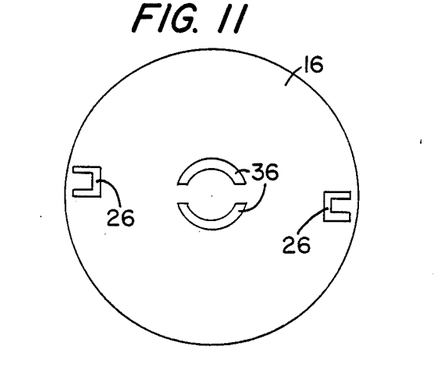
FIG. 11 is a plan view of a fourth embodiment of the invention.

FIG. 11 shows an embodiment with inner annular films 36 on a diaphragm 16 and outer C-shaped films 26.

Figure 12:
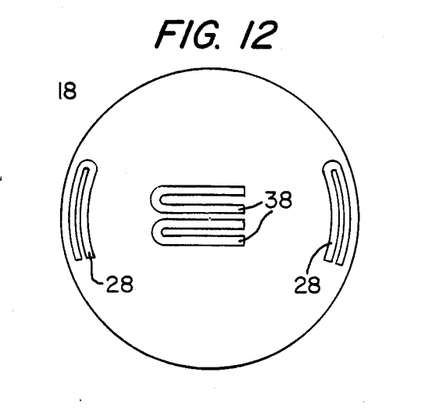
FIG. 12 is a plan view of a fifth embodiment of the invention.

FIG. 12 shows an embodiment with inner C-shaped films 38 and outer annular and C-shaped films 28.

While a specific embodiment of the invention has been shown and described in detail to illustrate the application of the principles of the invention, it will be understood that the invention may be embodied otherwise without departing from such principles.

We claim:

1. A method of measuring pressure utilizing a diaphragm carrying at least one thick film resistor extending in a longitudinal direction on said diaphragm, comprising:

orienting said diaphragm so that the pressure is applied normal to the longitudinal direction; and measuring any change in resistance of the at least one thick film resistor due to said normally applied pressure by calculating the change in resistance from the formula $$\frac{dR}{R} = C_x e_x + C_y e_y + C_z e_z + e_x - e_y - e_z$$

where $C_x$, $C_y$ and $C_z$ are resistivity coefficients for strains in the longitudinal, transverse and normal directions to the resistor and $e_x$, $e_y$ and $e_z$ are strains in the longitudinal, transverse and normal directions to the resistor.

2. A method according to claim 1, including calculating the strains in the longitudinal, transverse and normal directions according to the equations $$e_x = \frac{1}{E_s}\left[\frac{3P}{8h^2}((1-\nu^2)a^2 + (3\nu^2 - 3)x^2) - \nu P\right]$$

$$e_y = \frac{1}{E_s}\left[\frac{3P}{8h^2}((1-\nu^2)a^2 + (\nu^2 - 1)x^2) - \nu P\right]$$

$$e_z = \frac{1}{E_r}\left[P - \nu'\left(\frac{3P}{8h^2}((1+\nu')2a^2 - (1+\nu')4x^2)\right)\right]$$

where $e_x$, $e_y$, and $e_z$ are the radial, tangential and normal strains, P is the applied pressure, $\nu$ and $\nu'$ are the Poisson's ratio of the diaphragm and resistor, a is the diaphragm radius, $E_r$ and $E_s$ are the Young's modulus of the resistor and the diaphragm, h is the diaphragm thickness, and x is the radius at which the resistor is located.

3. A method of measuring pressure utilizing a diaphragm carrying least one thick film resistor extending in a longitudinal direction on said diaphragm, comprising:

orienting said diaphragm so that the pressure is applied normal to the longitudinal direction;

measuring any change in resistance of the at least one thick film resistor due to said normally applied pressure by calculating the total change in resistance from the formula $$\frac{dR}{R} = C_x e_x + C_y e_y + C_z e_z + e_x - e_y - e_z$$

where $C_x$, $C_y$ and $C_z$ are said resistivity coefficients for strains in the longitudinal, transverse and normal directions to the resistor, and $e_x$, $e_y$ and $e_z$ are said strains in said longitudinal, transverse and normal directions to the resistor; and calculating the strains in the longitudinal, transverse and normal directions to the resistor according to the equations $$e_x = \frac{1}{E_s}\left[\frac{3P}{8h^2}((1-v^2)a^2 + (3v^2-3)x^2) - vP\right]$$

$$e_y = \frac{1}{E_s}\left[\frac{3P}{8h^2}((1-v^2)a^2 + (v^2-1)x^2) - vP\right]$$

$$e_z = \frac{1}{E_r}\left[P - v'\left(\frac{3P}{8h^2}((1+v')2a^2 - (1+v')4x^2)\right)\right]$$

where P is the applied pressure, v and v' are the Poisson's ratio of the diaphragm and resistor, a is the diaphragm radius, $E_r$ and $E_s$ are the Young's modulus of the resistor and the diaphragm, h is the diaphragm thickness, and x is the radius at which the resistor is located.

* * * * *